United States Patent [19]

Zielke

[11] 3,796,387

[45] Mar. 12, 1974

[54] HUB-PLATFORM ASSEMBLY FOR CONTINUOUS-LOOP TAPES

[75] Inventor: Darrell W. Zielke, Valencia, Calif.

[73] Assignee: Superscope, Inc., Sun Valley, Calif.

[22] Filed: Apr. 2, 1973

[21] Appl. No.: 346,914

[52] U.S. Cl. .......................... 242/55.19 A, 242/71.9

[51] Int. Cl. ........................ B65h 17/48, B65h 75/24

[58] Field of Search ............. 242/55.19 A, 197, 198, 242/199, 200, 71.9, 71.8, 118.5, 118.6, 118.61, 118.62

[56] References Cited

UNITED STATES PATENTS

| | | | |
|---|---|---|---|
| 3,724,771 | 4/1973 | Zielke | 242/55.19 A |
| 3,350,028 | 10/1967 | Lear | 242/71.8 A |
| 2,905,408 | 9/1959 | Frate et al. | 242/118.5 |
| 3,088,687 | 5/1963 | Martin | 242/55.19 A |

FOREIGN PATENTS OR APPLICATIONS

| | | | |
|---|---|---|---|
| 42/20676 | 2/1967 | Japan | 242/55.19 A |

*Primary Examiner*—Billy S. Taylor

[57] ABSTRACT

A hub-platform assembly for a continuous loop magnetic tape cartridge in which the hub is rotatably mounted in a center hole in the platform, and the platform includes a set of angularly spaced bayonet pins projecting into the hole to enter a corresponding set of generally T-shaped slots in the hub, the slots having axially sloping walls to impart an axial displacement to the hub in response to a rotational movement relative to the platform. Detent buttons hold the pins releasably in the central portion of the slot, and additional detent buttons hold the pins releasably at either of the slot extremities, so that the hub may be positioned selectively in either a neutral position, a winding position in which a length of tape is wound in a roll about a conical surface of the hub, or a stripping position in which the hub is displaced axially from the winding position and the conical surface presents a smaller diameter to the roll of tape, facilitating stripping of tape from the inside of the roll and joining it to the outside end of the tape to form a continuous loop.

14 Claims, 8 Drawing Figures

PATENTED MAR 12 1974 3,796,387

HUB-PLATFORM ASSEMBLY FOR CONTINUOUS-LOOP TAPES

BACKGROUND OF THE INVENTION

This invention relates to an improved combination of a hub and a platform for use in winding a length of tape, particularly magnetic recording tape, into an annular roll, and joinging of the opposite end portions of the tape to form an endless loop. This type of endless tape is used in conventional single-reel, continuous loop, magnetic tape cartridges, in which the hub is rotatably mounted on a spindle, and the tape is drawn off the inside of the roll, driven in a loop past a transducer head, and simultaneously taken up on the outside of the roll.

An important step in manufacturing these cartridges is the stripping of a length of tape from the inside of the roll and joining of the opposite ends of the tape to form a loop of the desired size. In the past, if the roll was reasonably tightly wound, unwinding from the inside would often crimp, ruffle or crease the tape, with consequent adverse effects on performance. A significant improvement resulted from the introduction of the hub-platform assembly disclosed in the copending application entitled "Hub-Platform Assembly and Loop-Sizing Method," by Darrell W. Zielke, Ser. No. 123,689, filed Mar. 12, 1971, now U.S. Pat. No. 3,724,771, to which reference is made for purposes of description of the background of the present invention.

In the earlier embodiment disclosed in the aforesaid patent, the hub-platform assembly included a hub which was displaced axially relative to the platform in response to a rotational movement of the hub relative to the platform. The hub was formed with a conical winding surface which, upon axial displacement of the hub, reduced the effective diameter of the winding surface and produced a gap which facilitated stripping of a length of tape from inside the roll in order to form a loop.

To support the hub on the platform for such axial displacement, fingers on the platform projected into a set of slots in the hub in the winding position, and were shifted to a different set of slots during relative rotation and axial displacement. Considerable torque was required to index the hub through the required angle and to deform the fingers as required to move them from one set of slots to the other. Moreover, a very resilient and relatively expensive material was required, and disassembly of the parts was difficult. Additionally, the torque required to effect the axial displacement was likely to be affected by variations in part size within normal molding tolerances.

These problems complicated the full automation of the procedures for winding, loop-sizing and splicing tapes for use in continuous loop recording cartridges. The primary objective of this invention is to provide an improved hub-platform assembly for accomplishing the same general results in a simplified manner.

SUMMARY OF THE INVENTION

The present invention resides in a hub-platform assembly of the foregoing general character having a set of coupling pins which are easily insertible in and movable axially by a single set of slots, with reduced effort and reduced amounts of deformation, while being securely but releasably held in the slots and in different selected positions along the slots by resiliently flexible detent means. Rather than being transferred from one set of slots to another to accomplish the axial displacement of the hub and the platform, the pins simply are turned from one detented position to another, while being cammed axially within the slots.

As illustrated in the preferred embodiment of the invention shown herein, the improved assembly comprises a disk-like platform with a center hole, and a hub about which the tape is to be wound, having a base rotatably mounted in the hole and having axially spaced winding surfaces of different diameters. Angularly spaced pins project into the center hole from the platform and into a corresponding set of generally T-shaped slots in the base of the hub, the slots each having an axially sloping wall for imparting the axial displacement to the hub in response to rotational movement relative to the platform.

Each of the T-shaped slots in the hub has a central entry passage to admit one of the pins into the slot during assembly of the hub and platform, and oppositely extending, axially displaced, transverse passages to receive the pin in winding and stripping positions. Detent buttons hold the pins securely but releasably in the slot after insertion, and also in each of the operative positions, and only a slight torque is needed to overcome the detents. This allows manual displacement of the hub without mechanical aids to provide high torque, and also allows the use of a less resilient and less expensive material for the hub. Since the pins provide deep engagement with the slots in the hub, the torque required to snap the pins from one position to another is not affected by variations in pin lengths, nor is it significantly affected by variations of other part sizes within normal molding tolerances. Moreover, because the slots may be relatively short in a circumferential direction, vertical displacement of the hub requires relatively less rotational displacement compared with prior assemblies If it should become necessary or desirable, the pins may be rotated back to the central portions of the slots for removal of the hub from the platform. When a prerecorded message or program is to be wound into continuous loop cartridges, the prerecorded material is typically wound from a large reel of tape, the leading portion of which may begin with an incomplete message or program which can subsequently be easily stripped from the inside of the tape roll by removing the hub. Thus, ease of disassembly can be important.

Additional detailed advantages are the prevention of accidental disassembly by detent buttons in the entry passages of the slots, and symmetry of the platform, obviating the need to spacially orient it in an automated assembly procedure. Other objects and advantages of the invention will become apparent from the following detailed description, taken in conjunction with the accompanying drawings.

DETAILED DESCRIPTION

Figures 1, 2, 3, 4, 5, 6, 7, 8:
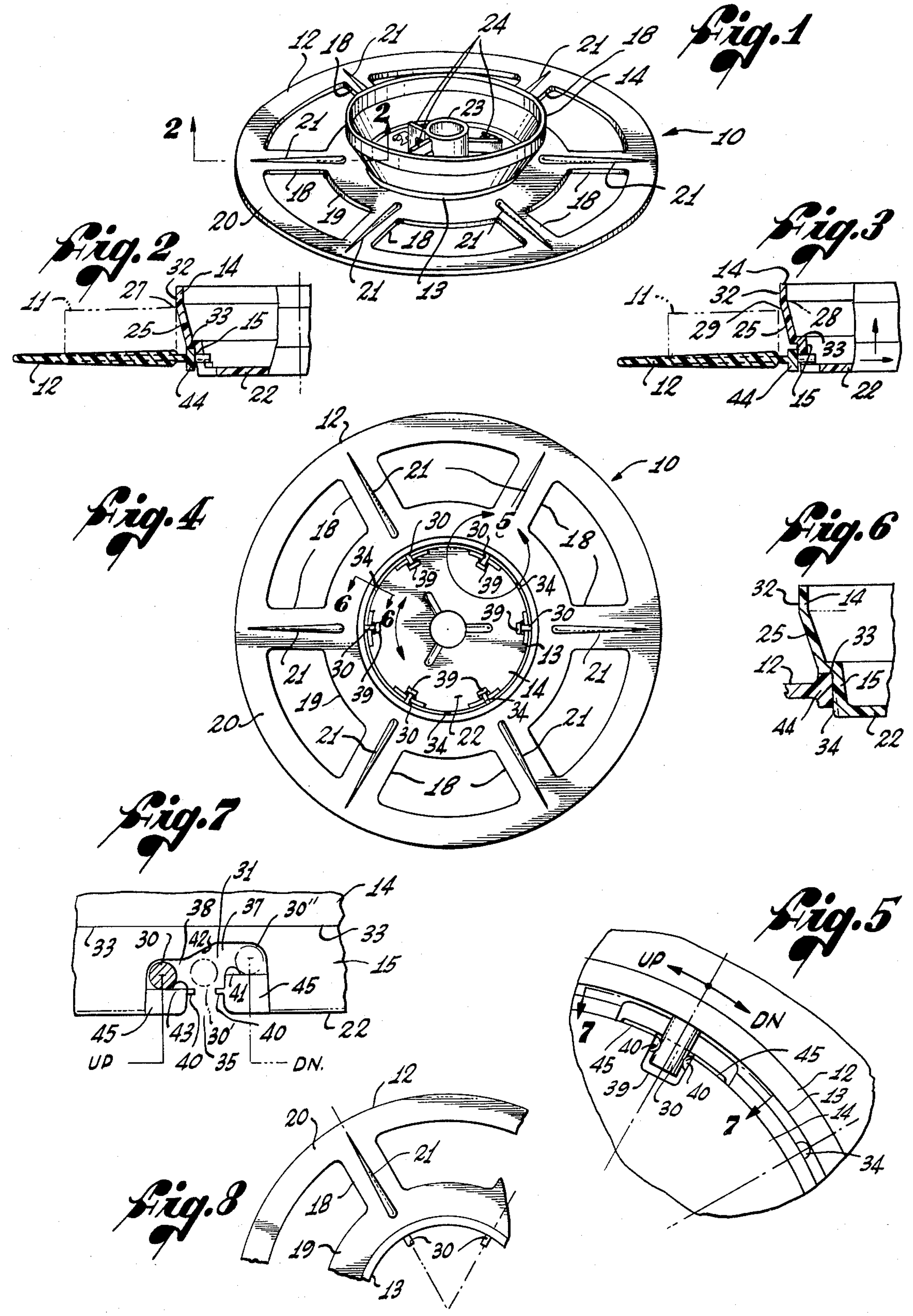
FIG. 1 is a perspective view of a hub-platform assembly embodying the novel features of the present invention.
FIG. 2 is an enlarged cross-sectional view of approximately one-half of the hub-platform assembly, taken substantially along line 2—2 of FIG. 1 with the hub in the winding position.
FIG. 3 is a view similar to FIG. 2 with the hub in the stripping position.
FIG. 4 is a bottom view of the hub-platform assembly of FIG. 1.
FIG. 5 is an enlarged fragmentary view of the parts of FIG. 4, taken within the arc 5 and illustrating the entry positions of those parts.
FIG. 6 is an enlarged fragmentary cross-sectional view taken substantially along line 6—6 of FIG. 4.
FIG. 7 is an enlarged fragmentary cross-sectional view taken substantially along line 7—7 of FIG. 5, showing a pin in the stripping position in full lines, in the winding position in broken lines, and in a neutral position in dotted lines.
FIG. 8 is a fragmentary bottom view similar to part of FIG. 4 but showing the platform alone.

As shown in the drawings for purposes of illustration, the invention is embodied in a hub-platform assembly, indicated generally by the reference number 10, for supporting a pancake or roll of magnetic recording tape, shown by the broken lines at 11 in FIGS. 2 and 3, in a conventional endless-loop tape cartridge (not shown). The tape is wound onto the hub-platform assembly, then spliced to form a continuous loop, and is adapted to be stripped or unwound from the inside of the roll 11 while being simultaneously wound back on to the outside of the roll after being driven past a transducer head (not shown) for recording or playing back signals on the tape.

The hub-platform assembly 10 generally comprises a disk-like platform 12 having a circular center hole 13, and a hub 14 of circular cross-section having a cylindrical base end portion 15, the lower end portion in the drawings. This base end portion 15 is fitted into the center hole 13 with an opposite end portion projecting upwardly from the platform 12. The tape is wound around the upper end portion with the lower edge of the tape in contact with the upper side of the platform 12, which thus forms a peripheral flange around the hub 14 to hold the lower edge of the tape generally in a plane normal to the axis of the hub as the roll or pancake 11 is wound on the assembly.

The platform 12 has a plurality of flat spokes 18 extending radially from a circular central portion 19 to an annular peripheral portion 20, and a plurality of radial ribs 21 preferably are formed along the spokes on both sides of the platform. The ribs 21 taper from a maximum height near the center hole 13 to zero height near the circumference of the platform 12 and hold the tape pancake 11 away from the flat portions of the platform. The cylindrical base 15 of the hub 14 of the presently preferred embodiment of the invention has a lower end wall 22, and a coaxial sleeve 23 projects upwardly in the center thereof and is braced by spokes 24 to support the assembly 10 rotatably on a spindle (not shown).

As shown most clearly in FIGS. 2 and 3, the hub 14 is formed with an outside surface 25 which is conically tapered toward the platform 12, and about which the tape is wound. This conical surface provides two axially spaced winding surfaces 27 and 28 of different diameters, and the hub 14 is mounted on the platform 12 for selective axial movement from a winding position, as shown in FIG. 2, in which the larger surface 27 is positioned to determine the initial inside diameter of the roll 11, to a stripping position, as shown in FIG. 3, in which the smaller surface 28 is positioned to determine the inside diameter, the larger surface being shifted out of the roll as an incident to such movement.

Thus, the tape may be wound about the larger surface 27, and the hub 14 may then be shifted to the stripping position to create a gap 29 of selected size between the hub and the inside of the roll 11. This gap 29 permits the tape to be tightened down about the hub 14 by pulling out the ends of the tape and joining them to form a loop, the length of which is determined by the radial width of the gap.

In accordance with the present invention, the axial movement of the hub 14 with respect to the platform 12 is effected by the cooperation of a set of angularly spaced pins 30, shown most clearly in FIGS. 5, 7 and 8, projecting from the hub into the center hole 13, and a corresponding set of generally T-shaped slots 31 (FIG. 7) in the cylindrical base 15 of the hub. In each of the slots 31, the side portions of the "T" are axially displaced from each other, so that the hub 14 is held in two different axial positions when the pins 30 are in the opposite side portions of the "T," and can be moved from one axial position to the other by rotation of the hub relative to the platform to shift the pins from one side portion to the other. In effect, the pins 30 and the slots 31 form a plurality of so-called bayonet-slot couplings which produce axial displacement of the hub 14 in response to angular displacement of the pins within the slots.

The pins 30 are held releasably in the slots 31 and held in each selected position in the slots by detent means which permit the axial movement of the hub 14 to be effected with substantially less material deformation, and consequently less torque, than in prior assemblies of this general type. The assembly 10 also requires less angular displacement of the hub 14 to produce a given amount of axial displacemnt, is easily disassembled, has an operating torque relatively unaffected by normal variations in part sizes, and, because of the low material deformation, allows the use of a less resilient and less expensive material for the hub.

The basic configuration of the hub 14 may be substantially the same as in the aforesaid patent. As shown in FIGS. 2, 3 and 6, the conical surface 25 of the hub 14 adjoins a cylindrical portion 32 at its upper and wider end, and adjoins a peripheral annular shoulder 33 at its lower end, the shoulder in turn adjoining the cylindrical base 15 of the hub, as most clearly shown in FIG. 6. The hub 14 is composed of a resiliently flexible plastic, for example linear polyethylene, and the cylindrical base 15 preferably has a plurality of longitudinal ribs 34 (FIGS. 4 and 5) spaced around its circumference to provide a smooth fit with the center hole 13 of the platform 12.

The platform 12 is composed of a somewhat less flexible plastic than the hub 14, for example polystyrene, and the bayonet pins 30 are circular in cross-section and extend substantially radially into the hole 13 for a distance somewhat greater than the thickness of the walls of the cylindrical base 15. Each of the T-shaped slots 31 for receiving the pins 30 has an entry passage 35 (FIG. 7) parallel to the axis of the hub 14 and opening into the lower end of the cylindrical base 15 to receive one of the pins as the hub is fitted to the platform 12. The entry portion 35 of each slot 31 intersects two distinct side portions 37 and 38 extending in opposite directions from, and at right angles to, the central portion, one side portion 37 being positioned close to the shoulder 33 and the other portion 38 being offset axially toward the end wall 22 of the cylindrical base 15.

The central entry portion 35 of each of the slots 31 opens through the end wall 22 of the cylindrical base 15, as shown at 39 (FIGS. 4 and 5), to allow the pins 30 to enter the central portions 35 as the hub 14 is fitted in the center hole 13. Two resiliently flexible detent buttons 40 are formed on the sidewalls of each central portion 35 and have free ends that are more closely spaced than the diameter of the pins 30, so as to admit the pin into the slot and then to retain the pin releasably in the slot after the hub is fitted in the hole. Thus, these buttons 40 prevent accidental removal of the hub 14, but permit intentional removal if it should become necessary.

After initial assembly of the hub 14 and the platform 12, the bayonet pins 30 are positioned in the central portions of the slots, as indicated at 30′ in FIG. 7. From this position, the hub is turned counter-clockwise, as viewed in FIG. 4, to shift the pins into the side portions 37 of the slots 31, i.e., the raised side portions closer to the shoulder 33, as indicated at 30″ (FIG. 7). In this position, the pins 30 are in the highest position relative to the hub 14, and the hub is in its lowest position relative to the platform 12, i.e., in the winding position as shown in FIG. 2. A detent button 41 in each slot 31 holds the pins 30 releasably in this position.

After the tape roll 11 has been wound, the hub 14 is turned to the stripping position shown in FIG. 3, clockwise as viewed in FIG. 4, with a manually applied torque that is sufficient to overcome the retaining force of the detent buttons 41. As the hub 14 is turned, the pins 30 move along transitional ramp surfaces 42 (FIG. 7) which are inclined downwardly to cam the pins downwardly, thereby pulling the platform 12 downwardly relative to the hub. The pins 30 enter into the opposite side portions 38 of the slots 31 past another set of detent buttons 43 and thereafter are retained releasably in these portions by the buttons, to hold the hub 14 in the stripping position shown in FIG. 3.

To facilitate assembly, the platform 12 is symmetrical about a plane normal to the axis of the assembly and the pins 30 are uniformly spaced, so that the hub 14 fits with the platform in all of the different angular relations in which the pins are aligned with the entry portions of the slots 31, and from both sides of the platform. The central circular portion 19 of the platform 12 has an annular rim 44 (FIGS. 2, 3 and 6) surrounding the hole 13 and raised above the flat portions of the platform on each side. The bayonet pins 30 project inwardly from the rim 44 with their axes in the plane of symmetry of the platform 12 and the rim is dimensioned to fit flush against the shoulder 33 of the hub 14 when the assembly 10 is in the winding position, as shown in FIGS. 2 and 6.

Preferably, the cylindrical base 15 of the hub 14 is very slightly tapered towards the end wall 22 to facilitate removal of the hub 14 from the mold in which it is formed. For the same reason, the side of the base 15 is recessed at 45, in the areas in which the slots 31 are formed, as shown most clearly in FIGS. 5 and 7.

From the foregoing, it can be seen that the improved hub-platform assembly of the present invention constitutes a significant advance, having the advantages of ease of assembly, disassembly, and manipulation between the different operative positions, low material deformation and consequently low operating torque and the capability of being composed of less expensive material, an operating torque relatively unaffected by size variations within normal molding tolerances, relatively small rotational movement, and low risk of accidental disassembly. It also will be apparent that, while a preferred embodiment of the invention has been illustrated and described in detail, various changes and modifications may be made without departing from the spirit and scope of the invention.

I claim:

1. A hub-platform assembly for a continuous loop tape cartridge, comprising:

a platform in the form of a disk having a center hole;

a hub having a cylindrical base portion composed of resiliently flexible material and fitted rotatably in said center hole, a frusto-conical winding surface tapering toward said base portion, and an annular shoulder joining the smaller end of said winding surface with said base portion, said shoulder being positioned to engage one side of said platform and locate said hub in a winding position;

a set of angularly spaced pins integral with said platform and projecting into said center hole;

a set of generally T-shaped slots angularly spaced around said cylindrical base portion to receive said pins, each of said slots having a central passage for receiving one of said pins as said hub is fitted to said center hole, a first transverse passage extending generally at a right angle in one circumferential direction from said central passage, and a second transverse passage extending generally at a right angle in the opposite circumferential direction from said central passage, said second transverse passage being a predetermined axial distance further from said shoulder than said first transverse passage, whereby rotation of said hub with respect to said platform moves said pins from said first transverse passage to said second transverse passage and thereby moves said hub axially outward from said platform through the predetermined distance from the winding position to a stripping position; and detent means for holding said pins releasably in selected positions in said slots.

2. A hub-platform assembly as set forth in claim 1, wherein said detent means include a pair of detent buttons integral with said base portion on opposite sides of said central passage, for preventing inadvertent removal of said hub from said central hole.

3. A hub-platform assembly as set forth in claim 2, wherein said detent means also include:

second detent buttons integral with said base portion in said first transverse passage, for preventing inadvertent movement of said hub from the winding position; and third detent buttons integral with said base portion in said second transverse passage, for preventing inadvertent movement of said hub from the stripping position.

4. A hub-platform assembly as set forth in claim 3, wherein each of said slots is defined in part by an axially sloping transitional surface joining said first and second transverse passages to guide said pins between said transverse passages and to coact with said pins as cams.

5. A hub-platform assembly as set forth in claim 1, wherein each of said slots is defined in part by an axially sloping transitional surface joining said first and second transverse passages to guide said pins between said transverse passages and to coact with said pins as cams.

6. A hub-platform assembly as set forth in claim 1, wherein said platform is symmetrical about a plane normal to its axis.

7. A hub-platform assembly for use in winding and thereafter supporting a continuous loop of tape in an annular roll, comprising:

a platform in the form of a disk having a center hole surrounded by a flat annular portion for supporting the tape roll;

a hub having a generally cylindrical base portion fitted rotatably in said center hole and an opposite end portion projecting outwardly from said platform, said opposite end portion including a conical peripheral winding surface tapering toward said platform, whereby a predetermined axial movement of said hub outward from said platform correspondingly reduces the effective diameter of said winding surface to facilitate joining the opposite ends of the tape to form the continuous loop;

a set of angularly spaced pins on said platform projecting into said center hole;

a set of generally T-shaped slots angularly spaced around said cylindrical base portion to receive said pins, each of said slots having a transverse passage with opposite extremities displaced axially by a predetermined distance, and an entrance passage intersecting said transverse passage to guide a corresponding one of said pins into said transverse passage as said hub is fitted into said center hole, whereby a rotational movement of said hub with respect to said platform moves said bayonet pins along said transverse recesses and imparts the predetermined axial movement to said hub; and means for holding said hub in one angular position relative to said platform for winding of the tape roll thereon, and in another angular position for formation of the loop.

8. A hub-platform assembly as set forth in claim 7, wherein each of said entrance passages has at least one detent therein, for admitting said pins into said slots and thereafter preventing inadvertent disassembly of said hub from said platform.

9. A hub-platform assembly as set forth in claim 7, wherein said holding means comprise detents for admitting said pins into said transverse passages and thereafter preventing inadvertent movement of said bayonet pins from the extremities of said transverse passages.

10. A hub-platform assembly as set forth in claim 7, wherein said platform is symmetrical about a plane normal to its axis.

11. A hub-platform assembly for use in winding and supporting thereon a length of tape in an annular roll and joining the opposite ends of the tape to form a loop, comprising:

a platform member in the form of a disk having a center hole surrounded by a flat annular portion for supporting the tape roll;

a hub member having a generally cylindrical base portion fitted rotatably in said center hole and an opposite end portion projecting outwardly from said platform, said opposite end portion having a first winding surface of a preselected diameter spaced a selected distance from said platform, and having a second winding surface of a lesser diameter closer to said platform, whereby a predetermined axial movement of said hub outward from said platform correspondingly reduces the effective diameter of said hub presented to the tape roll to facilitate joining the opposite ends of the tape;

a set of angularly spaced projections on one of said members; and a set of angularly spaced, generally T-shaped slots in the other of said members positioned to receive said pins, said slots having sloping portions for imparting an axial displacement to said hub relative to said platform in response to a rotational displacement.

12. A hub-platform assembly as set forth in claim 11, further comprising:

detent means for retaining said pins in said slots to prevent inadvertent disassembly of said hub and said platform.

13. A hub-platform assembly as set forth in claim 12, further comprising:

second and third detent means for retaining said pins at the extremities of said slots to prevent inadvertent movement from a selected position of said hub relative to said platform.

14. A hub-platform assembly as set forth in claim 11, wherein said platform is symmetrical about a plane normal to its axis.

* * * * *